(12) United States Patent
Behringer et al.

(10) Patent No.: US 11,543,003 B2
(45) Date of Patent: Jan. 3, 2023

(54) ELECTRIC AXLE MODULE WITH 2-SPEED TRANSMISSION FOR HYBRID PASSENGER VEHICLE

(71) Applicant: EATON INTELLIGENT POWER LIMITED, Dublin (IE)

(72) Inventors: Sarah E. Behringer, Southfield, MI (US); Thomas A. Genise, Dearborn, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/957,250

(22) PCT Filed: Dec. 18, 2018

(86) PCT No.: PCT/EP2018/085421
§ 371 (c)(1),
(2) Date: Jun. 23, 2020

(87) PCT Pub. No.: WO2019/121635
PCT Pub. Date: Jun. 27, 2019

(65) Prior Publication Data
US 2021/0404535 A1 Dec. 30, 2021

Related U.S. Application Data

(60) Provisional application No. 62/599,980, filed on Dec. 18, 2017.

(51) Int. Cl.
*F16H 3/089* (2006.01)
*B60K 1/00* (2006.01)
(Continued)

(52) U.S. Cl.
CPC ............... *F16H 3/089* (2013.01); *B60K 1/00* (2013.01); *B60K 17/043* (2013.01); *B60K 17/08* (2013.01);
(Continued)

(58) Field of Classification Search
CPC ............. F16H 3/089; F16H 2200/0021; F16H 2200/0034; B60K 1/00; B60K 17/043;
(Continued)

(56) References Cited

U.S. PATENT DOCUMENTS 3,292,456 A * 12/1966 Saari ....................... F16H 48/22
475/249
9,453,564 B1 * 9/2016 Pritchard ............. B60K 17/346
(Continued)

FOREIGN PATENT DOCUMENTS

DE   202005019438 U1   4/2007
DE   102010024580 A1   12/2011
(Continued)

*Primary Examiner* — Timothy Hannon
*Assistant Examiner* — Farhana Pervin
(74) *Attorney, Agent, or Firm* — Merchant & Gould P.C.

(57) ABSTRACT

An electric axle assembly includes an electric motor having an output shaft. A two stage gear train is coupled with the output shaft. The two stage gear train includes two reduction gears which provide different gear ratios. A differential is provided. A hollow differential input shaft is splined with the differential wherein the hollow input shaft supports driven gears that rotate independently relative to the hollow differential input shaft. A sliding dog clutch is splined to the hollow differential input shaft selectively engaging the driven gears or maintaining a neutral position wherein the electric motor and gear train are disconnected from the differential.

17 Claims, 4 Drawing Sheets

(51) Int. Cl.
    *B60K 17/04*           (2006.01)
    *B60K 17/08*           (2006.01)
    *B60K 17/16*           (2006.01)
    *B60K 6/547*           (2007.10)

(52) U.S. Cl.
    CPC ............ *B60K 17/165* (2013.01); *B60K 6/547* (2013.01); *B60K 2001/001* (2013.01); *B60K 2001/006* (2013.01); *F16H 2200/0021* (2013.01); *F16H 2200/0034* (2013.01)

(58) Field of Classification Search
    CPC ...... B60K 17/08; B60K 17/165; B60K 6/547; B60K 2001/001; B60K 2001/006; B60K 2007/0092
    See application file for complete search history.

(56) References Cited

U.S. PATENT DOCUMENTS

| | | | |
|---|---|---|---|
| 9,694,662 B2 * | 7/2017 | Nett | ................ B60K 6/48 |
| 2012/0083380 A1 | 4/2012 | Reed et al. | |
| 2015/0330492 A1 * | 11/2015 | Lee | ............ F16H 1/36 |
| | | | 475/331 |
| 2018/0216713 A1 * | 8/2018 | LaForce | ............... B60K 17/046 |

FOREIGN PATENT DOCUMENTS

| | | | | |
|---|---|---|---|---|
| DE | 102012213859 A1 | | 2/2014 | |
| DE | 102015216385 A1 | | 3/2017 | |
| JP | 2017161000 A | * | 9/2017 | ............... B60K 1/00 |
| WO | WO-2014089157 A1 | * | 6/2014 | ............... B60K 1/00 |

\* cited by examiner

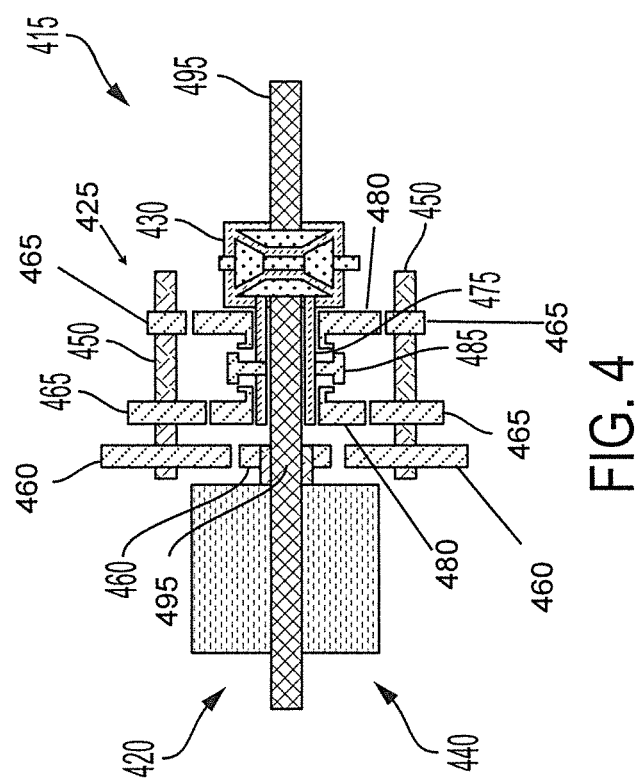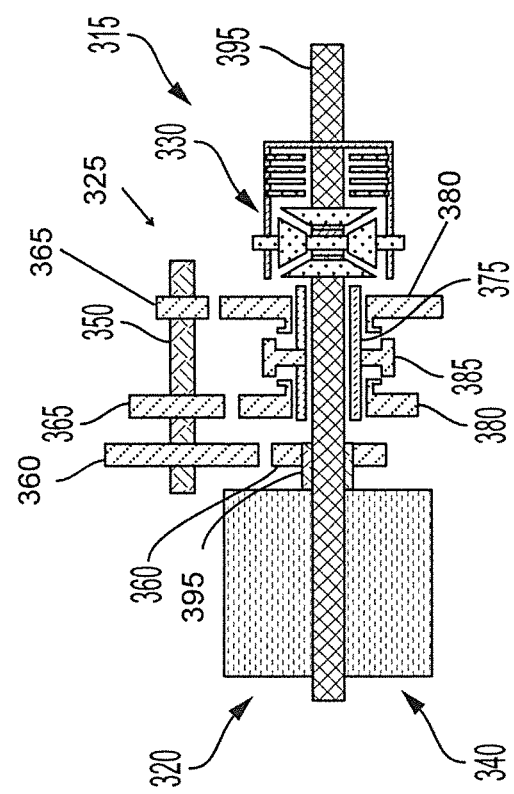
FIG. 4
FIG. 3

ELECTRIC AXLE MODULE WITH 2-SPEED TRANSMISSION FOR HYBRID PASSENGER VEHICLE

CROSS-REFERENCE TO RELATED APPLICATIONS

This application claims priority to U.S. provisional application No. 62/599,980 filed on Dec. 18, 2017 which is incorporated herein by reference in its entirety.

FIELD OF THE INVENTION

The invention relates to electric axles and with more particularity to electric axles with a two speed transmission.

BACKGROUND OF THE INVENTION

Electric vehicles including hybrids and all electric vehicles are becoming a larger percentage of a global automotive market. Electric vehicle sales are expected to grow due to emissions regulations and the improvement in the driving range and batteries of such vehicles.

Electric drive axles or e-axles may be utilized to drive the front, rear or both axles of a vehicle. E-axles may be utilized in a rear axle of a hybrid vehicle which is typically a front wheel drive vehicle to provide all wheel drive capability.

There is a need in the art for an e-axle that is compact and easy to install in a vehicle. There is a further need for an e-axle that provides various speeds or gear ratios to improve the function of the e-axle under various driving conditions and loads.

SUMMARY OF THE INVENTION

In one aspect there is disclosed an electric axle assembly that includes an electric motor having an output shaft. A two stage gear train is coupled with the output shaft. The two stage gear train includes two reduction gears. A differential is provided. A hollow differential input shaft is splined with the differential wherein the hollow input shaft supports driven gears that rotate independently relative to the hollow differential input shaft.

In another aspect there is disclosed an electric axle assembly that includes an electric motor having an output shaft. A two stage gear train is coupled with the output shaft. The two stage gear train includes two reduction gears. A differential is provided. A hollow differential input shaft is splined with the differential wherein the hollow input shaft supports driven gears that rotate independently relative to the hollow differential input shaft. A sliding dog clutch is splined to the hollow differential input shaft selectively engaging the driven gears or maintaining a neutral position wherein the electric motor and gear train are disconnected from the differential.

In a further aspect there is disclosed an electric axle assembly that includes an electric motor having an output shaft. The output shaft is hollow and includes a drive gear formed thereon. A two stage gear train is coupled with the output shaft. The two stage gear train includes two reduction gears. A differential is provided. A hollow differential input shaft is splined with the differential wherein the hollow differential input shaft is supported by a bearing nested in the hollow output shaft. The hollow input shaft supports driven gears that rotate independently relative to the hollow differential input shaft. A sliding dog clutch is splined to the hollow differential input shaft selectively engaging the driven gears or maintaining a neutral position wherein the electric motor and gear train are disconnected from the differential.

BRIEF DESCRIPTION OF THE DRAWINGS

FIG. 3 is a schematic diagram of a two speed e-axle assembly having a concentric motor and a sliding dog clutch positioned downstream relative to a gear train and including a limited slip differential;

FIG. 4 is a schematic diagram of a two speed e-axle assembly having a concentric motor and a sliding dog clutch positioned downstream relative to a gear train and including twin countershafts;

DETAILED DESCRIPTION OF THE PREFERRED EMBODIMENTS

Figure 1:
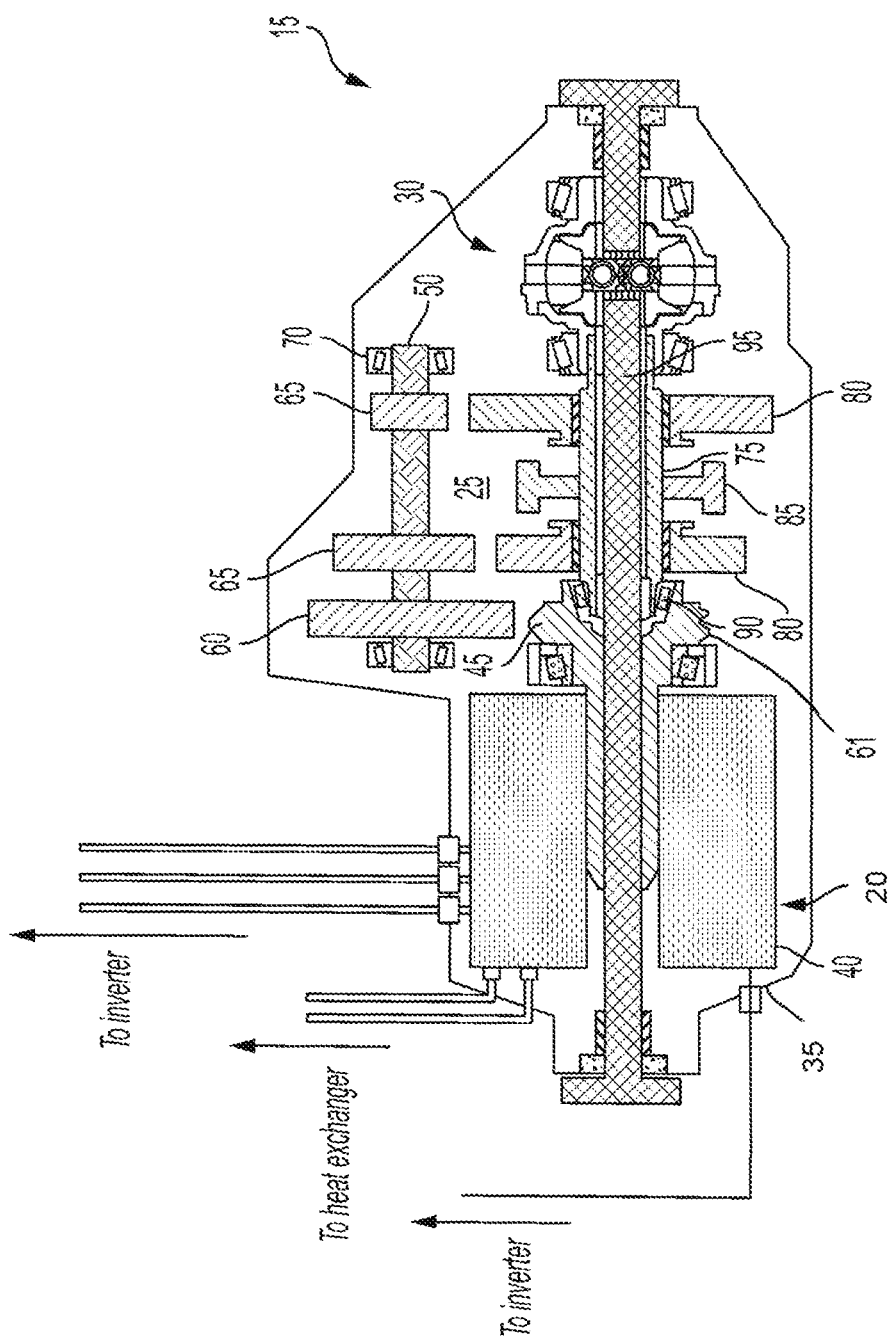
FIG. 1 is a schematic diagram of a two speed e-axle assembly having a concentric motor and a sliding dog clutch positioned downstream relative to a gear train.

Referring to FIG. 1, there is shown an electric axle assembly 15. The electric axle assembly 15 includes an electric motor assembly 20, two stage, two-speed, gear train 25, and a differential 30 disposed within an enclosure 35. Gear train 25 enables two different selectable gear ratios from the motor to the differential carrier, along with the ability to disconnect the motor and gear train from the differential carrier.

The electric motor assembly 20 includes an electric motor 40 having a hollow output shaft 45. The two stage gear train 25 includes a single counter shaft 50 positioned parallel to the hollow output shaft 45. The counter shaft 50 supports a driven gear 60 meshed with a drive gear 61 that is a permanent feature of the hollow motor shaft 45, while driven gear 60 is permanently fixed to the countershaft 50. The counter shaft 50 also supports the two reduction gears 65, both of which are permanently fixed to the countershaft 50. The counter shaft 50 is supported by bearings 70 in the enclosure 35.

A hollow differential input shaft 75 is splined to an open differential 30. The differential input shaft 75 supports the driven gears 80 that are positioned to mesh with the two stage reduction gears 65. Driven gears 80 are supported by hollow shaft 75 via bearings, which allow the gears 80 to rotate independently from the hollow shaft 75. A sliding dog clutch 85 is splined to the differential input shaft 75, allowing sliding dog clutch 85 to freely slide axially along shaft 75, allowing for selective engagement of either of the driven gears 80, or to maintain a disconnected or neutral position wherein the electric motor 40 and gear train 25 are disconnected from the differential 30. This selectivity is possible because the sliding dog clutch 85 is positioned downstream relative to the gear train 25.

The differential input shaft 75 is supported by a bearing 90 nested in the hollow output shaft 45. The electric motor assembly 20 is disposed concentrically relative to the hollow output shaft 45 and differential input shaft 75 for a compact packaging. Half shafts 95 are linked with the differential 30 to drive the wheels of a vehicle. One of the half shafts 95 is linked with the differential 30 and passes through the hollow differential input shaft 75 and the hollow output shaft 45 to provide a compact design.

Figure 2:
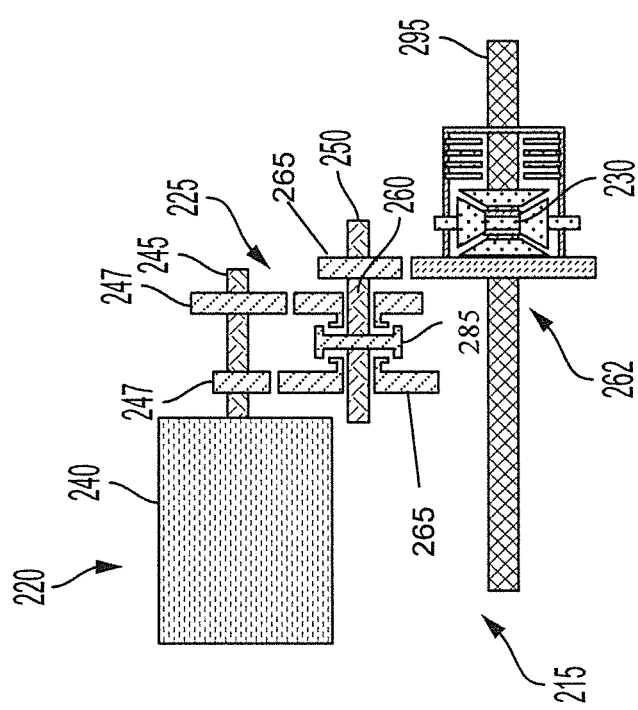
FIG. 2 is a schematic diagram of a two speed e-axle assembly having an offset motor and a sliding dog clutch positioned downstream relative to a gear train and including a limited slip differential.

Referring to FIG. 2, there is shown another electric axle assembly 215. The electric axle assembly 215 includes an electric motor assembly 220, two stage, two speed gear train 225, and a limited slip differential 230.

The electric motor assembly 220 includes an electric motor 240 coupled to a drive shaft 245. The two gears 247 are permanently fixed to the drive shaft 245. The two stage gear train 225 includes a single counter shaft 250 positioned parallel to the drive shaft 245. The counter shaft 250 supports a driven gear 260 meshed with the drive gear 262 of the limited slip differential 230. The counter shaft 250 also supports the two stage reduction gears 265 that selectively mesh with the two gears 247.

A sliding dog clutch 285 is splined to the counter shaft 250 to selectively engage either of the gears 265 with a corresponding input gear 247 or to maintain a disconnected position wherein the electric motor 240 is disconnected from the gear train 225 and limited slip differential 230. The sliding dog clutch 285 is positioned downstream relative to the gear train 225. Half shafts 295 are linked with the limited differential 230 to drive the wheels of a vehicle.

Referring to FIG. 3, there is shown an electric axle assembly 315. The electric axle assembly 315 includes an electric motor assembly 320, two stage gear train 325, and a limited slip differential 330. The depicted FIG. 3 is the same as that described above with reference to FIG. 1 with the differential being a limited slip differential 330.

Referring to FIG. 4, there is shown an electric axle assembly 415. The electric axle assembly 415 includes an electric motor assembly 420, two stage gear train 425, and a differential 430. The depicted FIG. 4 is the same as that described above with reference to FIG. 1 with a second counter shaft 450 that mirrors the first countershaft 450 and gear train as described above. The first and second counter shafts 450 may split the input forces of the countershafts 450 in order to reduce size and weight of the gears and gearbox housing.

Figure 5:
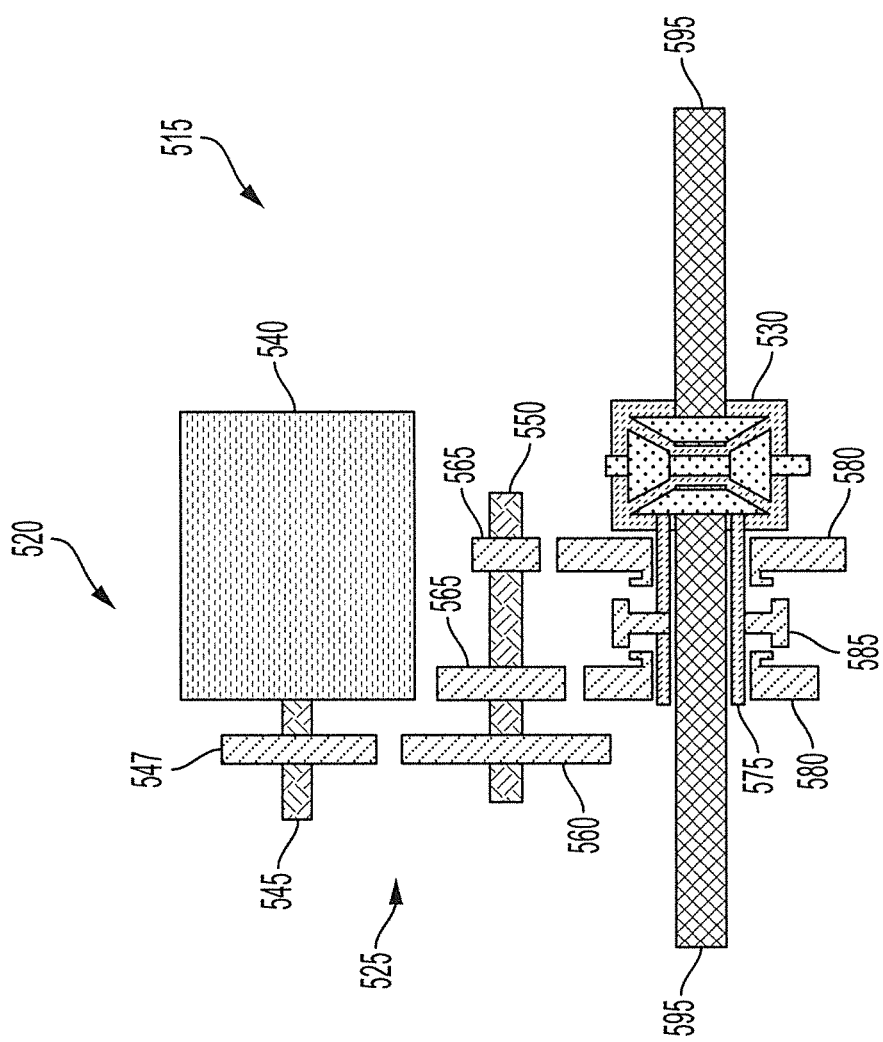
FIG. 5 is a schematic diagram of a two speed e-axle assembly having an offset motor and a sliding dog clutch positioned downstream relative to a gear train.

Referring to FIG. 5, there is shown an electric axle assembly 515. The electric axle assembly 515 includes an electric motor assembly 520, two stage, two-speed, gear train 525, and a differential 530. Gear train 525 enables two different selectable gear ratios from the motor to the differential carrier, along with the ability to disconnect the motor and gear train from the differential carrier.

The electric motor assembly 520 includes an electric motor 540 having an output shaft 545 having a drive gear 547. The two stage gear train 525 includes a single counter shaft 550 positioned parallel to the output shaft 545. The counter shaft 550 supports a driven gear 560 meshed with the drive gear 547. The counter shaft 550 also supports the two reduction gears 565, both of which are permanently fixed to the countershaft 550.

A hollow differential input shaft 575 is splined to an open differential 530. The differential input shaft 575 supports the driven gears 580 that are positioned to mesh with the two stage reduction gears 565. Driven gears 580 are supported by hollow shaft 575 via bearings, which allow the gears 580 to rotate independently from the hollow shaft 575. A sliding dog clutch 585 is splined to the differential input shaft 575, allowing sliding dog clutch 585 to freely slide axially along shaft 575, allowing for selective engagement of either of the driven gears 580, or to maintain a disconnected or neutral position wherein the electric motor 540 and gear train 525 are disconnected from the differential 530. This is possible because the sliding dog clutch 585 is positioned downstream relative to the gear train 525. Half shafts 595 are linked with the differential 530 to drive the wheels of a vehicle. One of the half shafts 595 is linked with the differential 530 and passes through the hollow differential input shaft 575 to provide a compact design.

The invention claimed is:

1. An electric axle assembly comprising:
   an electric motor having a hollow output shaft;
   a two stage gear train coupled with the hollow output shaft, the two stage gear train including two reduction gears;
   a differential;
   half shafts linked to the differential; and
   a hollow differential input shaft splined with the differential wherein the hollow differential input shaft is supported by a bearing nested in the hollow output shaft;
   wherein one of the half shafts passes through the hollow differential input shaft, the hollow output shaft, and the bearing.

2. The electric axle of claim 1, wherein the hollow differential input shaft supports driven gears that rotate independently relative to the hollow differential input shaft and includes a sliding dog clutch splined to the hollow differential input shaft selectively engaging the driven gears or maintaining a neutral position, wherein the electric motor and gear train are disconnected from the differential.

3. The electric axle of claim 1 wherein the output shaft includes a drive gear formed thereon.

4. The electric axle of claim 1, wherein the two stage gear train includes at least one counter shaft positioned parallel to the hollow output shaft, the counter shaft including a driven gear and the two reduction gears fixed to the at least one counter shaft.

5. The electric axle of claim 4, including two counter shafts positioned parallel to the hollow output shaft.

6. The electric axle of claim 4, wherein the electric motor is positioned parallel to a single counter shaft.

7. The electric axle of claim 1 wherein the differential is an open differential.

8. The electric axle of claim 1 wherein the differential is a limited slip differential.

9. The electric axle of claim 1 wherein the differential is an open differential or a limited slip differential.

10. An electric axle assembly comprising:
    an electric motor having a hollow output shaft;
    a two stage gear train coupled with the hollow output shaft, the two stage gear train including two reduction gears;
    a hollow differential input shaft splined with a differential wherein the hollow differential input shaft is supported by a bearing nested in the hollow output shaft, wherein the hollow differential input shaft supports driven gears that rotate independently relative to the hollow differential input shaft and includes a sliding dog clutch splined to the hollow differential input shaft selectively engaging the driven gears or maintaining a neutral position, wherein the electric motor and gear train are disconnected from the differential.

11. The electric axle of claim 10, wherein the hollow output shaft includes a drive gear formed thereon.

12. The electric axle of claim 11 further including half shafts linked to the differential, one of the half shafts passing through the hollow differential input shaft and the hollow output shaft.

13. An electric axle assembly comprising:
an electric motor having an output shaft, wherein the output shaft is hollow and includes a drive gear formed thereon;
a two stage gear train coupled with the output shaft, the two stage gear train including two reduction gears;
a differential;
a hollow differential input shaft splined with the differential, wherein the hollow differential input shaft is supported by a bearing nested in the hollow output shaft and wherein the hollow differential input shaft supports driven gears that rotate independently relative to the hollow differential input shaft and includes a sliding dog clutch splined to the hollow differential input shaft selectively engaging the driven gears or maintaining a neutral position, wherein the electric motor and gear train are disconnected from the differential.

14. The electric axle of claim 13 further including half shafts linked to the differential, one of the half shafts passing through the hollow differential input shaft and the hollow output shaft.

15. The electric axle of claim 13, wherein the two stage gear train includes at least one counter shaft positioned parallel to the hollow output shaft, the at least one counter shaft including a driven gear and the two reduction gears fixed to the at least one counter shaft.

16. The electric axle of claim 15 including two counter shafts positioned parallel to the output shaft.

17. The electric axle of claim 15, wherein the electric motor is positioned parallel to a single counter shaft.

* * * * *